Jan. 28, 1958   R. A. CHAPELLIER ET AL   2,821,325
CLOSURE FOR PRESSURE VESSELS
Filed Jan. 12, 1955   5 Sheets-Sheet 1

INVENTORS
Robert A. Chapellier
Einar E. Tangard
BY
Eldon H. Luther
ATTORNEY

Fig. 5.

INVENTORS
Robert A. Chapellier
Einar E. Tangard
ATTORNEY

Fig. 6.

United States Patent Office 2,821,325
Patented Jan. 28, 1958

2,821,325

CLOSURE FOR PRESSURE VESSELS

Robert A. Chapellier, Whitestone, and Einar E. Tangard, Scarsdale, N. Y., assignors to Combustion Engineering, Inc., New York, N. Y., a corporation of Delaware Application January 12, 1955, Serial No. 481,396

18 Claims. (Cl. 220—46)

This invention relates to pressure vessels provided with readily removable closures and particularly to vessels of rather large diameter adapted to have developed therewithin high internal pressures and having a relatively large closure or closures connected thereto in a fluid tight manner capable of withstanding these high internal pressures and yet capable of being readily removed to permit access to the interior of the vessel.

In certain industrial processes large vessels are employed and are operated under very high internal pressures as for example, 2000 pounds per square inch. It is often required that access openings be provided in these vessels which permit the insertion and removal of very large equipment necessitating these openings being as large as practicable and often equal to the internal diameter of the vessel itself.

With these very high internal pressures and large diameters the resulting force acting upon the closures for these openings is likewise very high rendering the problem of positively securing the closures within these openings in a fluid tight manner a difficult one.

The organization of the present invention overcomes this problem in an expeditious manner and the invention in general comprises a vessel having an opening provided therein and which may advantageously take the form of a vessel having an open upper end. This opening is adapted to be closed by a closure member which is insertable within the opening with the inward insertion of this member being limited by stop means extending radially inward from the wall of the opening. Also provided in the wall of the opening is an annular recess forming a generally inwardly facing surface. Opposed to this inwardly facing surface and positioned inwardly of this surface is a shoulder formed on a radially extending flange provided at the inner end of the closure. The closure is positively locked or retained within the opening by means of segments of a conical ring which are positioned about the closure and rest upon this shoulder. These segments are tiltable about an axis adjacent their inner edge to and from a radially outward position where they are interposed between the opposed surface on the wall of the opening and the shoulder on the closure member and a radially inward position where they are entirely free of this surface on the wall of the opening and where they permit the closure to be removed from the opening.

In order that these segments will be securely clamped between this opposed surface and shoulder after they have been tilted to their radial outward position and prior to the development of pressure within the vessel mechanical means are provided to move the head outward of the opening a sufficient distance to take up the lost motion in the locking mechanism. This mechanical means is preferably located inwardly of the outer end of the opening and intermediate the periphery of the closure member and the wall of the opening. Fluid leakage past the closure member is effectively prevented by a seal preferably positioned adjacent to the outer end of the opening where it is readily accessible, with the seal being constructed in a manner to permit limited relative radial and axial movement between the closure and the vessel wall, which may be due to differential expansion as well as metal deformation.

It is an object of this invention to provide an improved pressure vessel having a closure secured within an opening in the vessel in a manner which positively retains the closure within the opening against the large force developed by the high pressure within the vessel and which prevents fluid leakage past the closure, but which permits the closure to be readily removed from said opening when desired.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Figure 1:
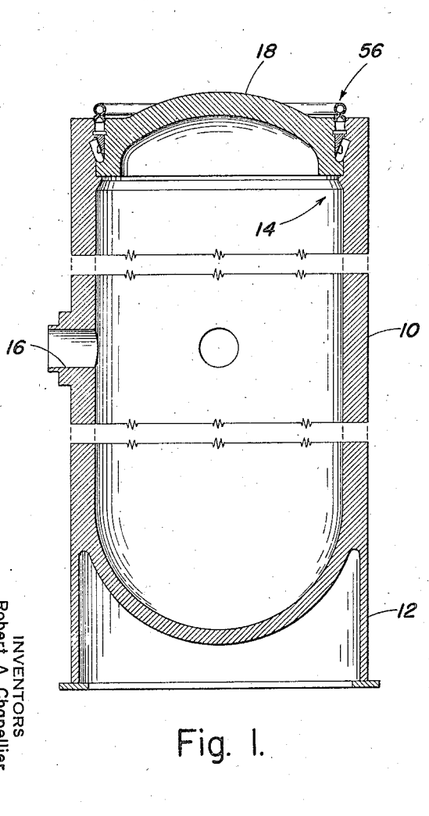
Figure 1 is a vertical sectional view of a pressure vessel embodying the present invention.

Referring now in detail to the drawings, wherein like reference characters are used throughout to designate like elements, the organization of Fig. 1 comprises a pressure vessel 10 which is illustratively disclosed in the general form of a vertical cylinder supported on skirt 12. This vessel is of large diameter, as for example, 7 ft., and has its upper end open at 14 to permit the insertion and removal of large equipment. In the illustrated vessel, relatively small radial openings 16 may be provided in the vertical wall in order to permit the attachment of piping and/or various actuating mechanism to the vessel and instrumentation of the vessel with these openings normally being sealed in a fluid tight manner by means not disclosed herein.

Normally received within opening 14 is the closure 18 which is provided at its inner end with radial flange 20 forming at its upper end the outwardly facing shoulder 22. The limit to which the closure may be inserted within opening 14 is governed by the radial stop member 24 extending radially inward from the wall of opening 14 and when the inner end of the closure is resting upon the stop member, shoulder 22 is located well inwardly of the inwardly facing surface 26 formed by means of annular recess 28 provided in the wall of the opening.

Figure 2:
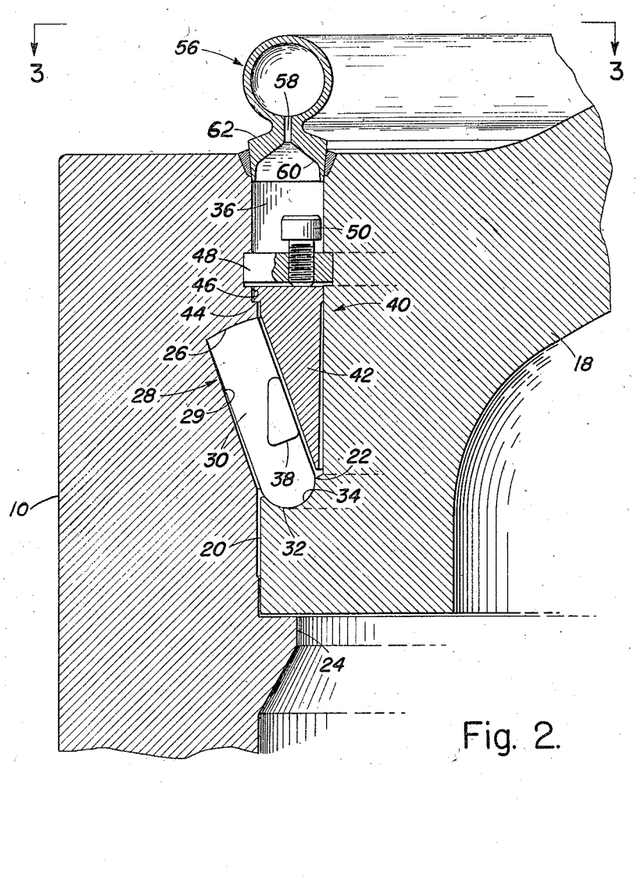
Figure 2 is a detailed fragmentary vertical section of the juncture of the closure and vessel showing in detail the mechanism for retaining the closure within the vessel and effecting a fluid tight seal therebetween.
Figure 4:
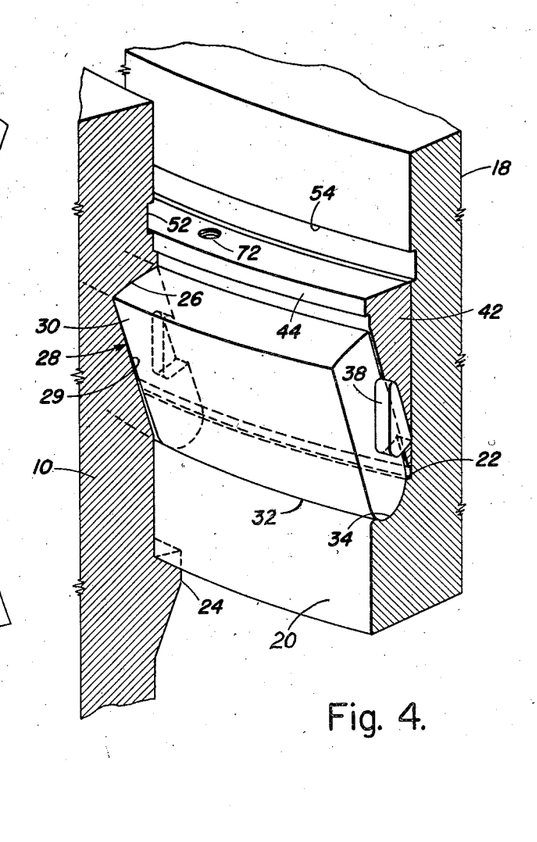
Figure 4 is a fragmentary perspective view of one of the locking segments in its outwardly tilted or locking position within the recess provided in the vessel wall with the seal and a portion of the jacking mechanism removed.
Figure 5:
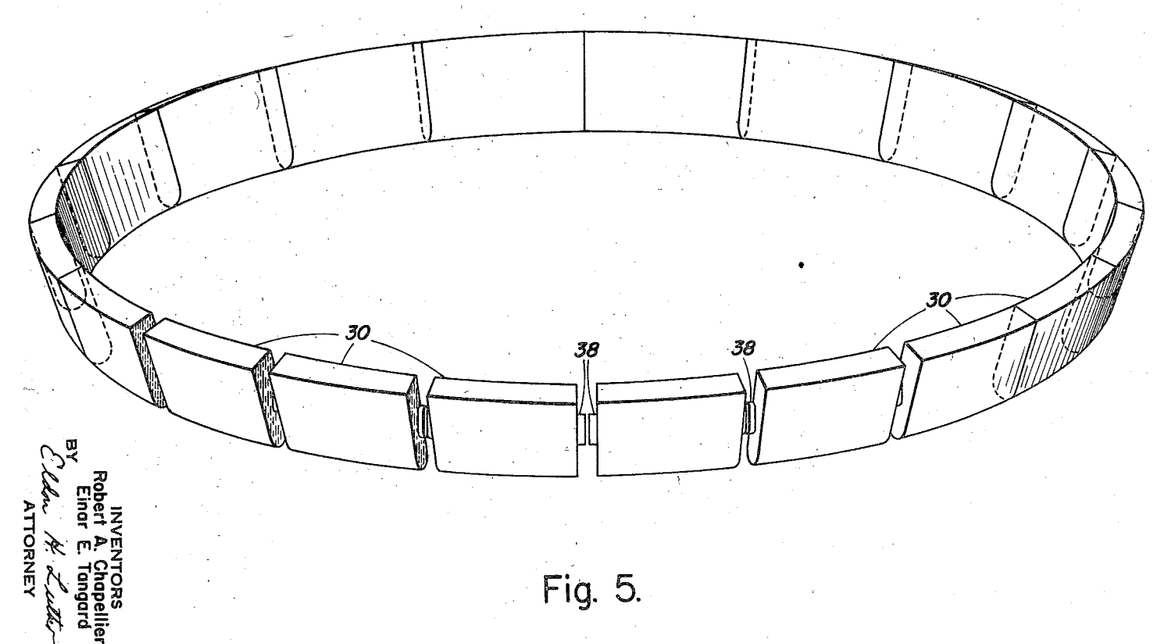
Figure 5 is a perspective view of the many segments of the locking mechanism shown in their outwardly tilted locking position where they in effect form a conical ring.
Figure 7:
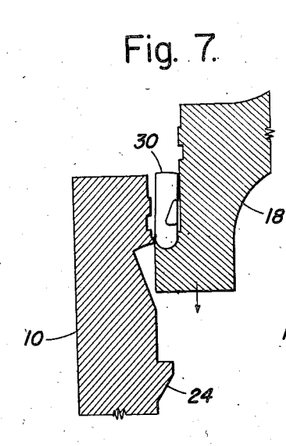
Figures 7 through 14 show in sequence various operations that are performed in assembling the closure within the opening and then disassembling the closure from the opening.
Figure 8:
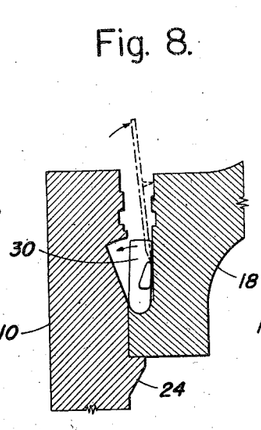

The closure is locked within opening 14 by means of the numerous locking segments 30 which are positioned in side by side relation about the closure with their semicircular inner edge 32 received within semicircular recess 34 formed on shoulder 22. These segments are tiltable about their lower ends from a radially inward position where they are contained entirely within the annular space 36 about shoulder 22 and are tilted slightly toward the axis of closure 18 (Fig. 7) and a radially outward position where they are disposed intermediate surface 26 and shoulder 22 with this position (illustrated in Figs. 2 and 4) being determined and limited by wall 29 of annular recess 28 which wall is engaged by the outward end of the segments, as shown, when in this position. The segments 30 are fabricated by cutting up a conical ring and when all of the segments are in their outwardly tilted position, with the segments, per se, being shown in this position in Fig. 5, they collectively form this ring from which they were fabricated. In the Fig. 5 organization the segments are shown closed spaced relative to one another, but if desired, this spacing may be made quite substantial for the insertion of jacking, bolting, or sealing devices.

Figure 14:
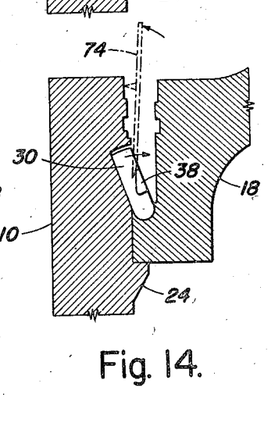

These segments are manually actuated to and from their outwardly and inwardly tilted position and to facilitate this pivotal movement of these segments and particularly movement of the segments from their outwardly tilted position to their inward position when the closure has not been removed for a considerable time projections 38 are provided on the sides of these segments for engagement by a suitable actuating lever (see Fig. 14). The circumferential length of the segments is such that they may be tilted to and from their radially outward and inward tilted positions without interference from each other and to accomplish this result a slight space is preferably provided between the projections 38 of adjacent segments when they are in their radially inward tilted position.

Figure 3:
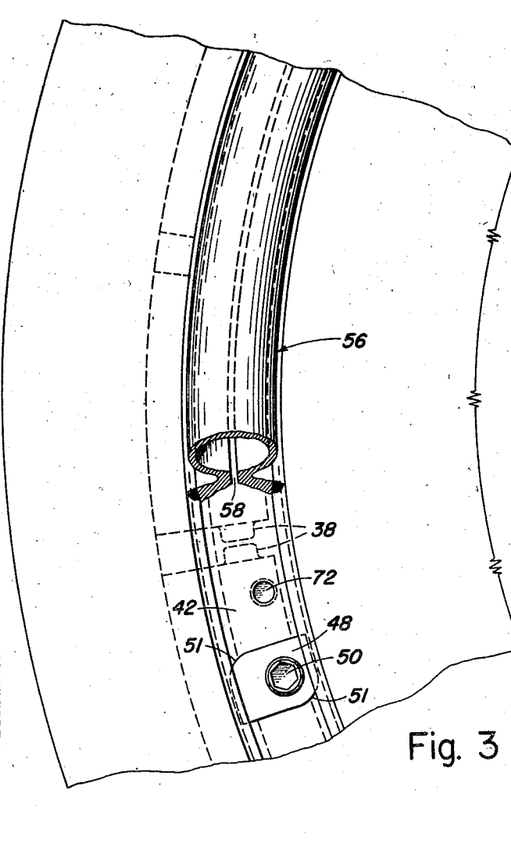
Figure 3 is a fragmentary plan view taken generally from line 3—3 of Fig. 2.

In order that the lost motion between the segments and surface 26 may be taken up and the segments securely clamped between the surface 26 and shoulder 22 prior to the development of pressure within vessel 10 jacking mechanism 40 is inserted into the annular space 26 and is effective to raise closure 18 relative to the wall of the vessel. This mechanism comprises annular ring 42 having a radially outward extending lip 44 at its outer end received within and resting upon the surface of annular recess 46 formed in the wall of opening 14. Also positioned within annular space 36 at uniformly spaced intervals about the closure are lugs 48 having jack screws or screw members 50 threaded thereinto. These lugs have a sufficiently small width to permit them to be inserted within space 36 from the top of the space to the location of the radially opposed annular recesses 52 and 54 formed in the wall of opening 14 and the periphery of closure 18 respectively. At this location the lugs may be rotated 90°, with the diametrically opposed corners 51 (Fig. 3) of the lugs being rounded to facilitate such rotation and when so rotated have their opposed ends received within opposed recesses 52 and 54 with the length of the lugs being only slightly smaller than the radial distance between these recesses for the accomplishment of this result. When the lugs are thus received within recesses 52 and 54 the downward threading of the jack screws into the lugs causes closure 18 to be raised relative to the vessel wall since the lower end of the screws engage the upper surface of ring 42 thereby jacking the closure upwardly relative to this ring and accordingly relative to the vessel wall.

The space between segments 30 and the periphery of closure 18 is substantially filled by ring 42 but the arrangement is such that the ring does not generally contact the segments. There is sufficient space provided between ring 42 and the segments to allow closure 18 (and the segments) to be raised the amount necessary to secure the segments between surface 26 and shoulder 22. However, after this is accomplished, if jack screws 50 are further threaded into lugs 48 ring 42 may be distorted into a conical configuration so that its inner end will engage the segments with this being a result that is not at all necessary but that will result in no injury to the mechanism, thereby making it unnecessary to have the operation of the screw members 50 precisely determined and allowing considerable latitude in their operation.

By having ring 42 substantially fill the space between segments 30 and the periphery of closure 18 this ring effectively insures that each of the segments is properly positioned in its locking or outwardly tilted position and prevents this space from becoming filled with corrosion which would make it extremely difficult to tilt the segments to their inward position for removal of the closure.

Fluid leakage between closure 18 and the wall of opening 14 is prevented by seal member 56 which may take the general form of a hollow metallic walled torus having an annular slot 58 provided therein and having an annular frame or base member 60 connected thereto at one side of slot 58 and welded to closure 18 and an annular frame member 62 connected thereto at the other side of slot 58 with this frame member being welded to the wall of vessel 10. This seal is welded into place after closure 18 has been raised by the mechanical jacking means so that the seal does not have to accommodate this rather large movement between the head and the vessel wall, with the seal then having to accommodate only such differential movement between these members as is caused by thermal expansion and/or bending or distortion of the metal, which movement is relatively small and will have no tendency to crack the seal itself or the welds by which it is secured to these members.

Figure 6:
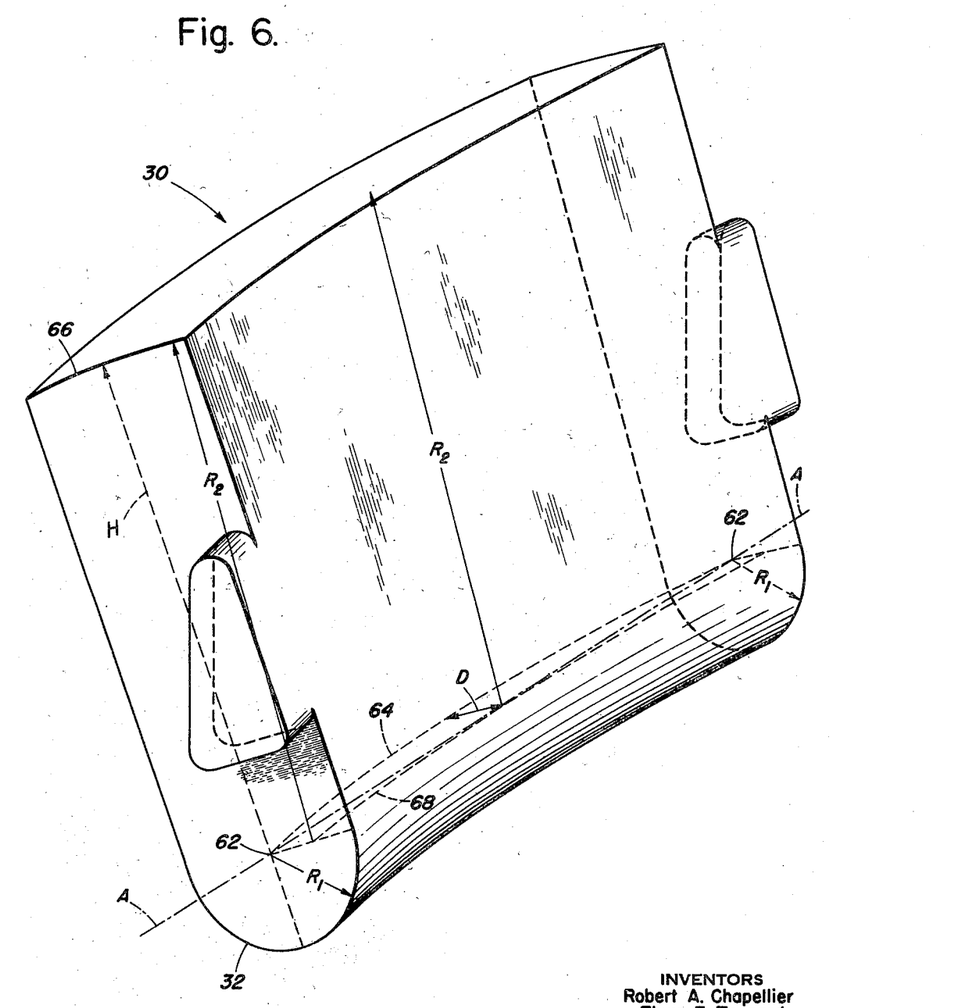
Figure 6 is a detailed perspective view of one of the locking segments.

Each of the segments 30 is so constructed as to permit the distance between surface 26 and shoulder 22 to be substantially equal to the corresponding axial or vertical length of the segment, and so as to make it unnecessary that this distance be greater than this corresponding axial length in order to permit the required tilting movement of the segment. Referring to Fig. 6, since each of the segments is a segment of a conical ring and has its semicircular edge nested within the complementary semicircular recess 34 they will, during their pivotal movement, rotate about axis A which is a straight line extending through the center of the semicircular inner edge at each side of the sector with these two center points being identified as 62, and from which extends the radius R1 for this inner edge. The center of this inner edge of the sector lies along the curved line 64 and since these sectors will rotate about their two ends during their pivotal movement with the center portion of the semicircular inner edge 32 intermediate these ends being raised from semicircular recess 34 when the segment is in its radially inward tilted position, if the arc of the arcuate end face 66 of the segment were swung from a radius extending from this line 64 the center portion of this end face intermediate the ends of the segments would also be raised an amount corresponding to the rise of the center portion of semicircular inner edge 32. This would require a substantial distance between end face 66 and surface 26 in order to accommodate this rise incident to tilting of the segment. In order to eliminate this necessity the radius of arcuate end face 66 is struck from line 68 which is parallel with line 64 but offset inwardly of this line the distance D between the center of axis A and the center of line 64 so that line 68 is tangent to axis A at the center of the axis and displaced radially inward from the ends of axis A a distance equal to distance D.

With radius R2 determined in this manner arcuate end face 66 will not be raised upwardly at its center since radius R2 at the center of the segment extends from the axis of rotation, and since surface 26 is complementary to end face 66 the distance between surface 26 and shoulder 22 may be substantially equal to the height H of the segment with this distance of course being slightly greater than this height to permit the segments to be tilted to their radially outward position without binding.

The inner edge 32 of each of the segments is so related to recess 34 in shoulder 22 and the outer face 26 of recess 28 is so related to surface 26 that when the segments are in their locking or in radially outward tilted position the force against closure 18 developed as a result of the superatmospheric pressure within vessel 10 acts generally through the center of the segments and in direction parallel to the side walls of the segments, or in other words generally through the axis H of the segments so that each of the segments is substantially free of lateral forces and twisting moments. While the formation of end face 66 in the manner hereinbefore described tends to create an inwardly directed force component this is so small that for practical purposes it may be ignored.

Figure 9:
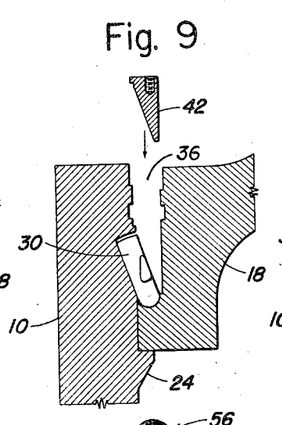
Figure 10:
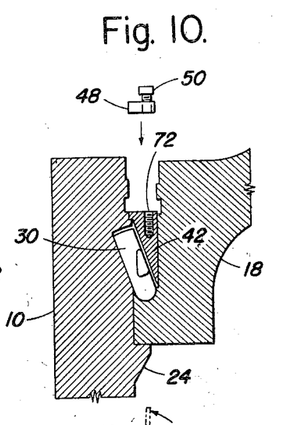
Figure 11:
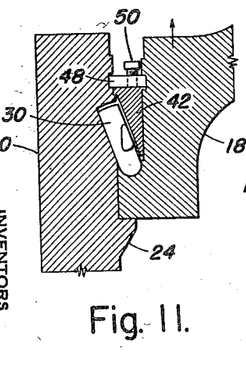
Figure 12:
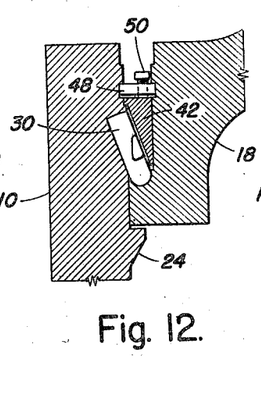
Figure 13:
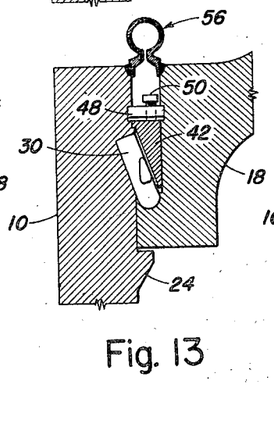

The various operating steps employed in assembling and disassembling the closure of this invention within the opening in the vessel are depicted in Figs. 7 through 14. When the closure is initially inserted into opening 16 (Fig. 7) each of the segments 30 occupies its extreme radially inward tilted position where it is inclined slightly toward the axis of the closure in order to prevent it from accidently being tilted outwardly. With the segments in this position closure 18 is lowered within opening 14 and into engagement with stop member 24. Thereafter each of the segments 30 is manually moved to its radially outward tilted position (Fig. 8) where it effectively locks closure 18 within opening 14. After the segments are so positioned ring 42 is inserted within annular space 36 and lugs 48 are lowered into this space and rotated 90° into their operative position received within annular recesses 52 and 54 (Figs. 9, 10 and 11). Closure 18 is then raised relative to the wall of the vessel 10 by threading jack screws 50 inwardly of lugs 48 and the segments 30 are thereby firmly clamped intermediate shoulder 22 and surface 26 (Fig. 12), after which seal member 56 is positioned in place and welded to closure 18 and the wall of vessel 10 forming a fluid tight seal between these members. Closure 18 is then operatively assembled within opening 14 in vessel 10 in a fluid-tight manner and in a manner to withstand an extremely high internal pressure within the vessel.

When it is desired to remove closure 18 from opening 14, the welds securing seal member 56 to the closure and the vessel are broken and the seal is removed permitting access to the jacking mechanism which is removed by threading screw members 50 outwardly of lugs 48 permitting the lugs to be rotated 90° and withdrawn upwardly through the annular space 36 after which ring 42 may be removed, with removal of the ring being facilitated by threaded bores 72 being provided therein for the reception of a suitable rod or the like. After the jacking mechanism has been removed segments 30 are tilted to their radially inward tilted postion by means of lever (Fig. 14), which engages projections 38 on the sides of the segments. With the segments in their inwardly tilted position closure 18 may be vertically lifted from opening 14.

With the novel organization of this invention the annular space 36 between the closure 18 and the vessel wall is maintained at a minimum so that the force exerted against seal 56 will be a minimum, while at the same time permitting the seal to be positioned at the end of the opening where it is readily accessible, and also permitting all of the mechanism for locking the closure within the opening to be positioned inwardly of this seal without having any actuating mechanism or other apparatus extending radially from the opening through the vessel wall to complicate the problem of providing a proper seal. The actuating mechanism is arranged in a manner to minimize difficulties that may be encountered due to corrosion, with the various elements being readily accessible when seal 54 is removed to provide maximum insurance that they may be removed even though rather badly corroded. Furthermore, the arrangement of these parts are such that should the corrosion be so bad as to resist all efforts to release these elements from their locked position they may be machined away without damaging the closure or the vessel wall.

Thus with the present invention a novel closure organization is provided which is extremely compact, simple and rugged, and which, while positively locking the closure within the opening of the vessel in a manner to withstand the extremely high forces that may be developed against the closure, still provides for easy and rapid removal of the closure.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. A pressure vessel having a circular opening provided in a wall thereof, a closure for said opening including a portion that is adapted to be positioned within said opening, the inner end of said closure having a radial flange presenting a generally outwardly facing shoulder, the wall of said vessel having an annular recess formed therein providing a generally inwardly facing surface, unitary segments of a conical ring disposed about said closure and resting on said shoulder in a manner permitting tilting movement about an axis adjacent their inner edge, said segments in their outwardly tilted position being disposed intermediate said shoulder and said surface and when operative to lock said closure within said vessel being in engagement with said shoulder and said surface with the upper end of said segments being complementary with said surface, said segments in their inwardly tilting position being entirely free of said surface.

2. A pressure vessel having a circular opening provided in a wall thereof, a closure for said opening including a portion that is adapted to be positioned within said opening, the inner end of said portion having a radial flange presenting a generally outwardly facing shoulder, the wall of said vessel having an annular recess formed therein providing a generally inwardly facing surface, unitary segments of a conical ring disposed about said closure and resting on said shoulder in a manner permitting tilting movement about an axis adjacent their inner edge, said segments having projections extending laterally from their ends to facilitate manipulation of said segments, these segments when in their outwardly tilted position being disposed intermediate said shoulder and said surface and when operative to lock said closure within said vessel being in engagement with said shoulder and said surface with the upper end of said segments being complementary with said surface, said segments in their inwardly tilted position being entirely free of said surface and when in their outwardly tilted position being disposed so that when pressure is applied within the vessel said segments are substantially free of lateral forces and twisting moments.

3. A pressure vessel having an upwardly facing circular opening with a generally vertical axis provided in a wall thereof, a closure for said opening including a portion that is adapted to be positioned within said opening, the inner end of said closure having a radial flange presenting a generally outwardly facing shoulder, the wall of said opening having an annular recess formed therein providing a generally inwardly facing surface, unitary segments of a conical ring disposed about said closure and resting on said shoulder in a manner permitting tilting movement about an axis adjacent their inner edge to and from a position where said segments are disposed intermediate said shoulder and said surface and when operative to lock said closure within said vessel being in engagement with said shoulder and said surface with the upper end of said segments being complementary with said surface and a position where said segments are entirely free of said surface and incline toward the axis of said closure, said segments being disposed so that when in their position intermediate said shoulder and said surface and pressure is applied within the vessel said segments are substantially free of lateral forces and twisting moments.

4. A pressure vessel having an upwardly facing circular opening with a generally vertical axis provided in a wall thereof, a closure for said opening including a portion that is adapted to be positioned within said opening, the inner end of said closure having a radial flange presenting a generally outwardly facing shoulder, stop means operative to limit the inward insertion of said closure within said opening, the wall of the opening having an annular recess formed therein providing a generally inwardly facing surface, means for locking said closure within said vessel against the force developed by the internal pressure of the vessel and including a plurality of unitary segments of a conical ring disposed about said closure and resting on said shoulder for tilting movement, when said closure is resting on said stop means, about an axis adjacent their inner edge to and from a position where they are disposed intermediate said shoulder and said surface and a position where they are entirely free of said surface and inclined slightly toward the axis of said closure with the distance between said shoulder and said surface, when the closure is resting on the stop means, being greater than the corresponding dimension of said segments to permit such tilting movement, said segments having end faces complementary with the respective shoulder and surface and in engagement therewith when acting to lock the closure in the vessel.

5. The organization defined in claim 4 including mechanical means operative to take up lost motion and securely clamp said segments between said shoulder and surface after they have been tilted outwardly to their locking position intermediate said shoulder and surface.

6. The organization of claim 5 wherein said mechanical means is disposed inwardly of the outer end of said opening, and wherein means are provided outwardly of said mechanical means for sealing the juncture of said closure and vessel wall in a fluid tight manner while permitting limited axial and radial movement therebetween.

7. The organization defined in claim 4 having mechanical means operative to raise said closure relative to the vessel after said segments are tilted to their locking position to securely clamp said sectors intermediate said shoulder and said surface, said means including a ring insertable intermediate the wall of said opening and the periphery of said closure and having a substantial axial dimension with a portion of the periphery of said ring being complementary to but normally spaced from the surface of said segments, said ring being supported from the vessel wall, a plurality of jack screw means uniformly disposed around the closure and including a lug received within complementary recesses formed in the wall of the opening and the periphery of the vessel and having a bolt member threaded therein and adapted to have its inner end bear against the outer surface of said ring and means disposed outwardly of said jack screw means for sealing the juncture of said closure and vessel wall in a fluid tight manner while permitting limited axial and radial movement therebetween.

8. A pressure vessel having an upwardly facing circular opening with a generally vertical axis provided in a wall thereof, a closure for said opening including a portion that is adapted to be positioned within said opening, the inner end of said closure having a radial flange presenting a generally outwardly facing shoulder, said shoulder having a radial groove formed therein of generally semicircular transverse section, the wall of said opening having an annular recess formed therein of generally triangular transverse section providing a generally inwardly facing surface opposed to said shoulder and disposed axially outward thereof when said closure is in its operative position within said opening, segments of a conical ring disposed about said closure and having a generally semicircular inner edge received within the groove in said shoulder for tilting movement about an axis extending through the center of said semicircle at each end of each segment to tilt said segments to and from a position where said segments are disposed intermediate said shoulder and said surface thereby locking the closure within the opening and a position where they are entirely free of said surface and are inclined slightly toward the axis of said closure thereby permitting withdrawal of said closure, said segments being arcuate with the radius of the arc extending from a line parallel with the center line of said semicircular inner edge but offset radially thereof so that a plane passing through the radius of the arcs at each end of the segments is tangent to said axis of rotation midway between the ends of the segments, said inwardly facing surface formed on the recess in the wall of the opening being complementary with said outer edge and in engagement therewith when the segments are effective to lock the closure within the vessel.

9. The organization of claim 8 including removable mechanical means for raising said closure relative to said vessels after the segments have been tilted to their locking position to securely clamp said segments between said shoulder and said surface, said means being located inwardly of the outer end of said opening and intermediate the periphery of said closure and the inner wall of the vessel, and sealing means located outwardly of said mechanical means effective to prevent fluid leakage between the closure and the vessel while permitting limited radial and axial movement therebetween.

10. The organization of claim 9 wherein said mechanical means includes a ring member supported by the vessel and substantially filling the space intermediate said segments and the periphery of the closure when said segments are in their locking position.

11. A pressure vessel having an open upper end, a closure for said opening with at least a portion of said closure adapted to be positioned within said opening and having a radial flange formed thereon presenting an outwardly facing shoulder having a generally semicircular groove formed therein, the wall of said opening having stop means associated therewith to limit the inward insertion of said closure therewithin and also having an annular recess formed therein of generally triangular transverse section providing a generally inwardly facing surface opposed to said shoulder and disposed axially outward thereof a predetermined distance when said closure is in engagement with said stop means, unitary segments of a conical ring disposed about said closure with each segment having an axial dimension slightly less than said predetermined distance and having a generally semicircular inner edge received within the groove in said shoulder for tilting movement about an axis extending generally through the center of said semicircle at each end of each segment to tilt said segments to and from a radially outward position limited by the other wall of said recess and where the segments are intermediate said shoulder and said surface and engage said shoulder and surface when operating to lock the closure in the vessel and a radial inward position where they are entirely free of said surface and have their axes inclined slightly toward the axis of said closure, said conical segments when tilted to their outward position collectively forming said conical ring and so disposed that the end force produced by the pressure within the vessel acting against the closure acts generally within the surface of revolutions generated by rotating the axes of said segments about the axis of said closure.

12. A pressure vessel having an open upper end, a closure for said opening with at least a portion of said closure adapted to be positioned within said opening and having a radial flange formed thereon presenting an outwardly facing shoulder having a generally semicircular groove formed therein, the wall of said opening having stop means associated therewith to limit the inward insertion of said closure therewithin and also having an annular recess formed therein of generally triangular transverse section with one wall thereof providing a generally inwardly facing surface opposed to said shoulder and disposed axially outward thereof a predetermined distance when said closure is in engagement with said stop means, unitary segments of a conical ring disposed about said closure with each segment having an axial dimension slightly less than said predetermined distance and having a generally semicircular inner edge received within the groove in said shoulder for tilting movement about an axis extending generally through the center of said semicircle at each end of each segment to tilt said segments to and from a radially outward position limited by the other wall of said recess and where the segments are intermediate said shoulder and said surface and engage said shoulder and surface when operating to lock the closure in the vessel and a radial inward position where they are entirely free of said surface and have their axes inclined slightly toward the axis of said closure, projections extending laterally from the end walls of said segments for facilitating such pivotal movement, said conical segments when tilted to their outward position collectively forming said conical ring and so disposed that the end force produced by the pressure within the vessel acting against the closure acts generally within the surface of revolutions generated by rotating the axes of said segments about the axis of said closure.

13. A pressure vessel having an open upper end, a closure for said opening with at least a portion of said closure adapted to be positioned within said opening and having a radial flange formed thereon presenting an outwardly facing shoulder having a generally semicircular groove formed therein, the wall of said opening having stop means associated therewith to limit the inward insertion of said closure therewithin and also having an annular recess formed therein of generally triangular transverse section with one wall thereof providing a generally inwardly facing surface opposed to said shoulder and disposed axially outward thereof a predetermined distance when said closure is in engagement with said stop means, segments of a conical ring disposed about said closure with each segment having an axial dimension slightly less than said predetermined distance and having a generally semicircular inner edge received within the groove in said shoulder for tilting movement about an axis extending generally through the center of said semicircle at each end of each segment to tilt said segments to and from a radially outward position limited by the other wall of said recess and where the segments are intermediate said shoulder and said surface and a radial inward position where they are entirely free of said surface and have their axes inclined slightly toward the axis of said closure, the outer edge of said segments being arcuate with the radius of the arc extending from a line parallel with the center line of said semicircular inner edge but offset radially thereof so that a plane passing through the radius of the arcs at each end of the segments is tangent to said axes of rotation midway between the ends of the segments, said inwardly facing surface formed on the recess in the wall of the opening being complementary with said outer edge, said conical segments when tilted to their outward position collectively forming said conical ring and so disposed that the end force produced by the pressure within the vessel acting against the closure acts generally within the surface of revolutions generated by rotating the axes of said segments about the axis of said closure.

14. A pressure vessel having an open upper end, a closure for said opening with at least a portion of said closure adapted to be positioned within said opening and having a radial flange formed thereon presenting an outwardly facing shoulder having a generally semicircular groove formed therein, the wall of said opening having stop means associated therewith to limit the inward insertion of said closure therewithin and also having an annular recess formed therein of generally triangular transverse section with one wall thereof providing a generally inwardly facing surface opposed to said shoulder and disposed axially outward thereof a predetermined distance when said closure is in engagement with said stop means, unitary segments of a conical ring disposed about said closure with each segment having an axial dimension slightly less than said predetermined distance and having a generally semicircular inner edge received within the groove in said shoulder for tilting movement about an axis extending generally through the center of said semicircle at each end of each segment to tilt said segments to and from a radially outward position limited by the other wall of said recess and where the segments are intermediate said shoulder and said surface and engage said shoulder and surface when operating to lock the closure in the vessel and a radial inward position where they are entirely free of said surface and have their axes inclined slightly toward the axis of said closure, said conical segments when tilted to their outward position collectively forming said conical ring and so disposed that the end force produced by the pressure within the vessel acting against the closure acts generally within the surface of revolutions generated by rotating the axes of said segments about the axis of said closure, and removable mechanical means for raising said closure relative to said vessel after the segments have been tilted to their locking position to securely clamp said segments between said shoulder and said surface.

15. A pressure vessel having an open upper end, a closure for said opening with at least a portion of said closure adapted to be positioned within said opening and having a radial flange formed thereon presenting an outwardly facing shoulder having a generally semicircular groove formed therein, the wall of said opening having stop means associated therewith to limit the inward insertion of said closure therewithin and also having an annular recess formed therein of generally triangular transverse section with one wall thereof providing a generally inwardly facing surface opposed to said shoulder and disposed axially outward thereof a predetermined distance when said closure is in engagement with said stop means, segments of a conical ring disposed about said closure with each segment having an axial dimension slightly less than said predetermined distance and having a generally semicircular inner edge received within the groove in said shoulder for tilting movement about an axis extending generally through the center of said semicircle at each end of each segment to tilt said segment to and from a radially outward position limited by the other wall of said recess and where the segments are intermediate said shoulder and said surface and a radial inward position where they are entirely free of said surface and have their axes inclined slightly toward the axis of said closure, the outer edge of said segments being arcuate with the radius of the arc extending from a line parallel with the center line of said semicircular inner edge but offset radially thereof so that a plane passing through the radius of the arcs at each end of the segments is tangent to said axis of rotation midway between the ends of the segments, said inwardly facing surface formed in the recess in the wall of the opening being complementary with said outer edge, said conical segments when tilted to their outward position collectively forming said conical ring and so disposed that the end force produced within the vessel acting against the closure acts generally within the surface of revolutions generated by rotating the axes of said segments about the axis of said closure, and removable mechanical means for raising said closure relative to said vessel after the segments have been tilted to their locking position to securely clamp said segments between said shoulder and said surface.

16. In an organization of the type described a pressure vessel having a circular opening provided therein said opening having an inwardly projecting closure stop, a closure for said opening at least a portion of which is adapted to be postioned therewithin and which is adapted to initially engage said stop, said closure having a radial flange adjacent its inner end providing a generally outwardly facing shoulder, the inner wall of the opening having an annular recess formed therein presenting a surface generally opposed to and spaced axially outward of said shoulder, a plurality of unitary segments of a conical ring disposed on said shoulder in side by side relation about said closure, said segments having an axial dimension slightly less than the distance between said opposed surface and shoulder and said segments being mounted for tilting movement about an axis adjacent their lower edge to and from a position where they are disposed intermediate said opposed surface and shoulder and engage said shoulder and surface when operating to lock the closure in the vessel and a position where they are entirely free of said surface, means for limiting the outward tilting of said segments so that when tilted outwardly to their limit said segments collectively form said conical ring with said segments being disposed when in this position so that the end force produced by the pressure within the vessel acts in a direction lengthwise of said segments and the coacting end faces of the segments are related to said surface and said shoulder so there is substantially no lateral force acting on said segments resulting from said end force, and means effecting a seal between said closure and said wall.

17. In combination, a pressure vessel having an outwardly facing circular opening with a generally vertical axis provided in a wall thereof, a closure for said opening including a portion that is adapted to be positioned within said opening, the surface of said opening having a radially extending inwardly facing annular surface spaced axially outwardly of a generally outwardly facing annular surface formed on the periphery of said closure, a plurality of unitary segments of a conical ring mounted on said generally outwardly facing surface in side by side relation about said closure for tilting movement so the upper end thereof may be moved outwardly from a position where said segments are free of said generally inwardly facing surface to a position where they lie intermediate said inwardly and outwardly facing surfaces and when operating to lock the closure in the vessel are in engagement with said inwardly and outwardly facing surfaces, said segments when in said latter position having a conical median surface corresponding to the conical median surface of said conical ring and being so arranged that the end force produced by the pressure within the vessel acting against the closure acts generally along said median surface, means for moving the closure outwardly of said opening a sufficient distance to securely clamp said segments between said spaced surfaces, and means providing a fluid tight seal between the vessel and the closure permitting limited relative movement therebetween.

18. In combination, a body member having an opening therein, a closure for said opening, means effective to limit the insertion of the closure within said opening, an inwardly facing shoulder means provided on and about the wall of the opening, an outwardly facing shoulder means provided about the closure and spaced inwardly from said inwardly facing shoulder in a direction axially of the opening a predetermined distance when the closure is inserted its limit into the opening permitted by the limiting means, a plurality of unitary individual members disposed about the closure and having a dimension axially of the closure that is slightly less than said predetermined distance, said members being in engagement with said outwardly facing shoulder means and tiltable about an axis adjacent thereto and from a position where said members are free of said inwardly facing shoulder means and an outward position where said members are interposed between said inwardly and said outwardly facing shoulders, the end faces of said members being complementary with the respective shoulders, and mechanical means operative to move the closure member outwardly of said opening after said members have been tilted outwardly to bring these complementary surfaces into engagement.

References Cited in the file of this patent

UNITED STATES PATENTS

| 1,902,494 | Emmet | Mar. 21, 1933 |
| 2,252,488 | Bierend | Aug. 12, 1941 |
| 2,662,663 | Schmidt et al. | Dec. 15, 1953 |

FOREIGN PATENTS

| 713,502 | Germany | Nov. 13, 1941 |
| 963,387 | France | Dec. 26, 1949 |